United States Patent
Cheskis

(10) Patent No.: US 7,886,378 B2
(45) Date of Patent: Feb. 15, 2011

(54) PROTECTIVE BLANKET

(75) Inventor: Tammy Lynn Cheskis, Arnold, MD (US)

(73) Assignee: Incog-Neato Corporation, Arnold, MD (US)

( * ) Notice: Subject to any disclaimer, the term of this patent is extended or adjusted under 35 U.S.C. 154(b) by 0 days.

(21) Appl. No.: 11/540,405

(22) Filed: Sep. 30, 2006

(65) Prior Publication Data

US 2007/0077845 A1 Apr. 5, 2007

Related U.S. Application Data

(60) Provisional application No. 60/722,862, filed on Oct. 3, 2005.

(51) Int. Cl.
*A47G 9/00* (2006.01)
*A47G 9/04* (2006.01)
*B32B 3/04* (2006.01)
*B32B 5/00* (2006.01)
*B32B 5/06* (2006.01)
*B32B 5/26* (2006.01)
*B32B 7/00* (2006.01)
*B32B 7/08* (2006.01)
*B32B 25/10* (2006.01)
*B32B 27/12* (2006.01)

(52) U.S. Cl. .................. 5/484; 5/482; 5/486; 5/737; 112/419; 428/98; 428/122; 442/389; 442/394; 442/399

(58) Field of Classification Search .................. 428/122, 428/98; 442/389, 394, 399; 5/482, 484, 5/486, 737; 112/419
See application file for complete search history.

(56) References Cited

U.S. PATENT DOCUMENTS

| | | | | |
|---|---|---|---|---|
| 4,499,131 | A * | 2/1985 | Knox | 428/68 |
| 4,597,121 | A * | 7/1986 | Bouma | 5/494 |
| 5,787,523 | A * | 8/1998 | Lindberg | 5/81.1 HS |
| 6,274,520 | B1 * | 8/2001 | Cordell | 442/381 |

* cited by examiner

*Primary Examiner*—David R Sample
*Assistant Examiner*—Brent T O'Hern
(74) *Attorney, Agent, or Firm*—Kenyon & Kenyon LLP

(57) ABSTRACT

The invention is in the field of child, human, or animal or unnatural protective covers for beds, furniture, car seats, floors, or any surface that needs to be protected from spills, or waste or bedwetting or accidental discharges of any type. The invention is washable, and has patterns that look nice and can be varied. In its preferred form, there are about five layers, with the top pleasing to the human eye and skin, which is quilted or otherwise attached to the second layer that is substantially absorbent such as a batting type of material that allows some liquid or other material to pass to the third set of liquid catching layers, which is typically a polymer having bonded thereto two cotton type fabric layers. All layers are bound together in some fashion.

4 Claims, 1 Drawing Sheet

PROTECTIVE BLANKET

CROSS REFERENCE TO RELATED APPLICATIONS

This application claims benefit to provisional application U.S. 60/722,862 filed Oct. 3, 2005

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The Invention is in the field of child, human, animal or natural or unnatural protective covers for any surfaces of substrate that requires protection including but not limited to beds, furniture, car seats, floors, boat seats, rugs, upholstery, clothes, rugs, bedding blankets, sheets, quilts, mattresses, tents or any type of surface or substrate that needs to be protected or can be protected from spills, waste, bedwetting, human discharges, animal discharges, natural discharges, manmade discharges, chemicals, liquids, or solids, or any material or any type that may or may not harm any substrate of any type. A discharge from a human or animal may be from any cavity or may include secretions not from a cavity, and may include sweat, saliva, regurgitation, urine, feces, or blood, or others, for example. For example, the invention can be used as a baby mat to protect the baby from the floor or any other surface such as in a car, boat, cushions, couch, chair, bed, crib or any type of substrate. It can be used to protect any substrate from maternity situations where water breakage or leakage during pregnancy occurs or to protect the bed. It can be used when elderly people have discharges that may be accidental. The invention is washable, and had patterns that look nice and can be varied. Some situations that are envisioned without limitation are different types of upholstery that can be protected which includes all types, such as in a home, car, boat, airplane, or other, but for example includes leather, or fabric, or any seats aided by the invention to be protected from any type of discharge, but more specifically from, for example, wet bathing suits having chlorine from pools or dirty river or other water, or the harmful substances involved in any type of swimming situation or other situations typical in such settings as spilled foods, or any type of product, involving fluids, or solids, or combinations in same.

2. Related Art

The most closely related art are hospital disposable fabrics. One such fabric is a double layered fabric which has one layer that is plastic, with another cotton type layer quilted to the plastic. It is not clear how the fabric is used or employed. Another type is employed under a sheet on a bed to protect a bed from accidental discharges or spills. It is essentially a rubber or plastic sheet. A major disadvantage of the prior art fabrics is that they are employed under sheets on beds, so that if there is an accidental discharge or spill, the whole bed must be stripped. Also, they do not catch liquid adequately.

SUMMARY OF THE INVENTION

The present invention allows the user to either lay the protective layered fabric on the sheets of a bed, or to replace the sheets of a bed, or to cover car seats, rugs, or any other substrate that needs to be protected as noted above, incorporated here by reference. It is designed in the preferred embodiment to have an outer layer that has a kid friendly, or eye pleasing design so that a child will not be embarrassed if it is lying on his or her bed, or if it is on the car seats. Also, a parent need not strip the bed in case of accidents while at the same time, children are please with the different designs and feel of the outer layer. In one embodiment, there are five layers. The first layer, or outer layer, is a fabric that typically has a design or pattern that is pleasing to the eye, and is made of a comfortable fabric pleasing to human skin, like a cotton sheet, depending on the use, having different weft, weaves, and fill counts or ratios, but allows liquids to quickly pass through. It could be 100% cotton, or any percentage ratio of cotton ranging from about 0 to about 100% of cotton to other material, including but not limited to polymers, for example, polyester, or any natural or manmade material. The second layer is typically, cotton or polyester type of batting fabric, or any type of fabric, that is somewhat absorbent, and preferably catches more liquid then it allows to pass through to the third set of layers. The third set of layers is actually a set of three sub-layers. In a preferred embodiment it is a fabric that one can buy at JOANNE's fabric store, located in Annapolis, Md. and perhaps other stores. One fabric that can be used had typically three sub-layers, and is essentially cotton sheetings on both sides of, and adhered to, a rubber layer inside. The first layer is typically quilted to the second batting type layer. The second batting layer is bounded to the third layer in any number of fashions known to one of skill in the art such as stitching, stapling, bonding, gluing, snapping, or any type of fastening, or could be quilted via the quilting tying the first layer to the second layer, or another quilting. Further, any method stated can be used with any layer disclosed in any combination either alone or together, to fasten any layer to any of the other layers. What is important is that when a spill or accidental discharge occurs, the liquid passed through the first layer, is somewhat or fully absorbed by the second layer, and is caught or stopped by the third layer. Usually the second sub-layer in the middle of the third set of layers catches the liquid since it is a material such as a polymer through which liquid cannot pass or absorb, thus keeping the back of the second sub-layer, and the third sub layer, dry. Thus, no liquid or solid passes through the device. Thus, it is a leak-proof protective blanket.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
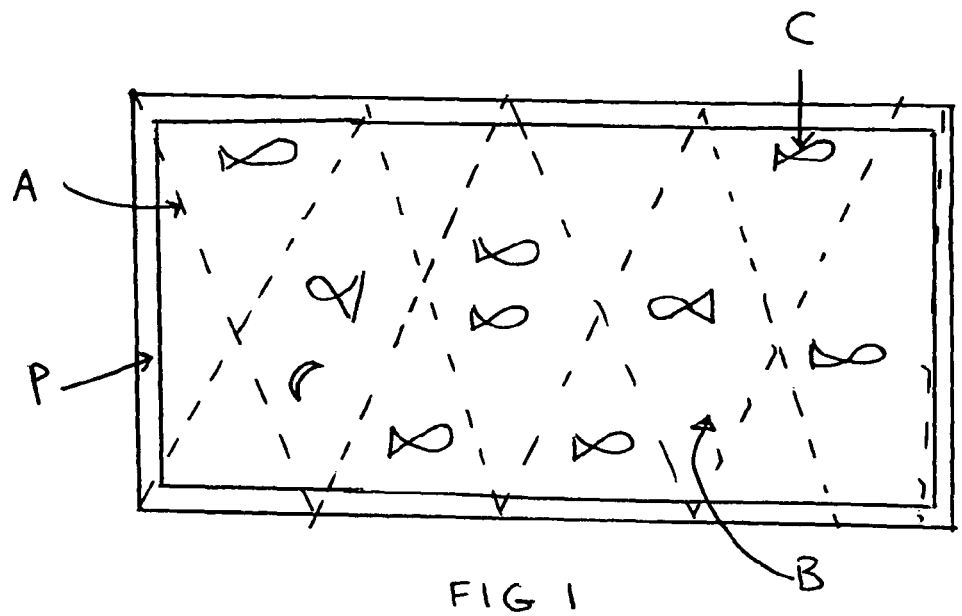
FIG. 1 is a top view of one embodiment the protective layered fabric.
Figure 2:
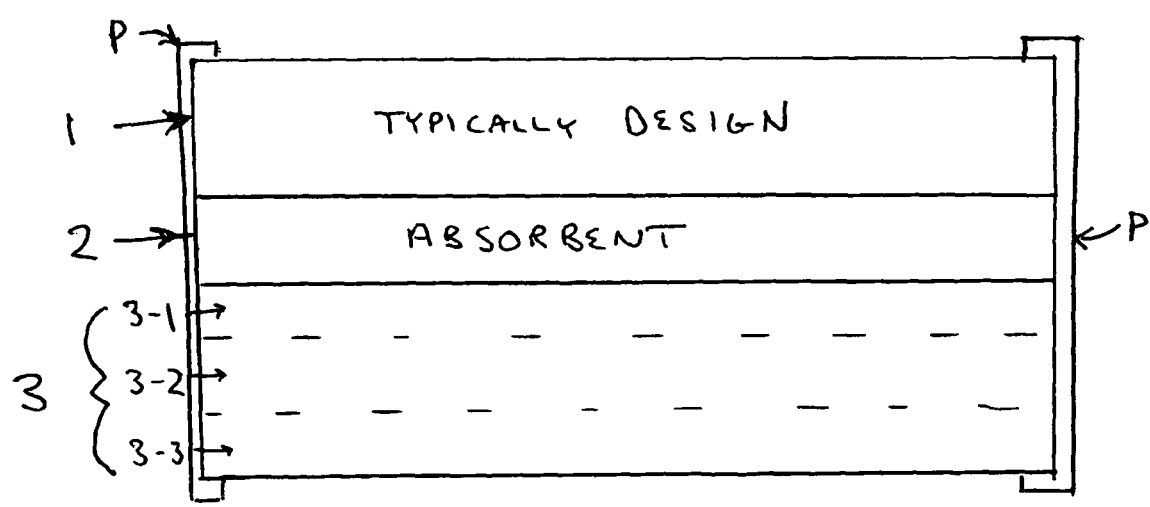
FIG. 2 is a schematic side of the protective layered fabric.

Referring to the accompanying drawings in which like reference numbers indicate like elements, FIGS. 1 and 2 schematic to and side views of the of the protective layered fabric of the invention. The protective layer fabric is comprised of three layers 1-3, with the third layer comprised of three layers, 3-1, 3-2, and 3-3. In the depicted embodiment, the top layer 1 is quilted to the second layer 2. By quilted, one of skill in the art understands that this can be any number of different types of stitching patterns of polygonal shape. The stitching lines a depicted in FIG. 1 are shown as crossing patterns creating rhomboidal or trapezoidal patterns B. These patterns could be any polygonal shape, including squares, rectangles, circles or any known polygonal or random type or nonrandom type stitching pattern. The top layer 1 usually allows most of the liquid or spill to pass through it to the second layer 2 to which the top layer 1 is quilted or stitched. Any type of design C can be employed. FIG. 1 depicts fish as the design C in this embodiment.

FIG. 2 also depicts the three layers. The second layer 2 is typically a cotton or polyester type batting fabric that preferably is somewhat absorbent and catches some or most or all of the liquid and allows some or none of it to pass to the third layer where it is further absorbed a little, but primarily is not absorbed, and is caught. The second layer could allow more or less liquid to pass through than it catches to the third set of layers, but in the preferred embodiment, it catches most or all of the liquid by absorption. If is the second layer absorbs too little liquid, then the liquid that passes through may run out of the sides of the device since it will be caught by the layer 3 of the device. Also, it may be desirable to fashion the second layer so that it does not catch too much liquid, or else the top layer may then get too wet as preferred for comfort. However, the second layer usually catches all or most of the liquid in the preferred embodiment, with the liquid absorbed throughout its thickness so that the top layer is not too wet. Any type of fabric that performs the function of catching a substantial portion of liquid, where substantial is defined as more than 50% of the liquid is preferred, but all types are contemplated. Thus, it is possible that the amount of liquid passed to the third layer, with the remainder absorbed in the second layer, with a little or none in the first layer, in some embodiments ranges from 0 to 100 percent passed, but more preferably very little passed to the third layer, preferably about 0-3% but it could be 1-5%, 0-5%, 3-10%, or any amount such as 10-20%, 0-50%, or any range within 0-100%, depending on the use and or materials. One can contemplate any percentage, such as any particular number or fraction types of spills. For example, one might design a situation such as 1% 33%, 58%, 63%, 84%, 84.5%, either passing through or absorbed into the second layer, etc. This statement applies to all the layers. Obviously, a solid type spill may not even get to the second layer for example, or pass through if it does. Or water or juice may be totally absorbed in the first and second layer. Suitable second or other layer fabrics include for example, those noted above as well as polyurethane, cotton-poly blends, wool, or any natural or manmade single or blended type of fabric including woven, nonwoven, natural or manmade synthetic or no synthetic fibers that perform the above function. There could be a combination or stack of such layers. The third set of layers depicted as layer 3 at FIG. 1 us actually a set of three sublayers, but there could be more. In a preferred embodiment it is a fabric that one can buy in JOANNE's fabric store, located in Annapolis, Md. and perhaps other stores. It is preferable that it is essentially cotton sheetings 3-1 and 3-3 on both sides of a rubber or any type of polymer layer, or other type of material that holds liquid, 3-2. Suitable materials may include rubber, silicone, vinyl, or any type of polymer blend that holds liquid, manmade or natural. Any type of adherent can be employed such as any type of glue, adhesive or other means of fastening. It is possible that the layer 3-2 itself is heated to create the adherent material to fabrics 3-1 and 3-3. The layer 3-2 itself could be an adhesive. Or it could be a heat or pressure type activated material that becomes adhesive when heated or activated by pressure such as those typically known to those of skill in the art. The liquid or solid holding middle layer, whether adhesive or not, whether it has adhesive on either side of it, attaches to the two layers 3-1 and 3-3 in a preferred embodiment by bonding or adhesion. However, layer 3-1 or 3-3 or both are not required. Or layer 3-1 can be several layers of like or different materials, as many layer 3-2, or layer 3-3, including any of the materials noted here or not noted. Or there may be several layers 3 each composed of layers 3-1, 3-2, and 3-3, or some or all layers 3 may have some or all layers 3-1 or 3-2 or 3-3.

The first layer 1 is typically quilted to the second batting layer type layer 2. The second batting layer is bounded to the third layer in any number of fashions known to one of the skill in the art such as stitching, stapling, bonding, gluing, snapping, or any type of fastening. The quilting may go though the first and second layers to the third layer to attach to it, and may or may not be the same as the quilting design on the top layer 1. Typically, the top layer is the thinnest, with the second thicker than the third. But any relative thickness may be employed, such as the third the thickest or the top the thickest or any layer thicker than any other layer. The top layer need not have a design, but typically for most embodiments, as noted FIGS. 1-2, it will.

Also shown in FIG. 1 is a piping border P sandwiching or binding all three layers, overlapping the top and bottom, or the outermost layers, to create edges of the border inside the edges of the top and bottom of the first and third layers. This piping traps any liquid within the cover and prevents spillage through the edge of the protective blanket. The piping is typically a border that comprises a folded over piece of material, having the at least three layers inside the fold, and going around the perimeter A stitch typically goes through all three layers, first through the top layer of the piping, then through the at least three layers of the protective blanket, and finally through the bottom of the piping layer. It could be a piece of tape that wraps around the three layers. See FIG. 2, for the piping layer P shown in cross section. In a preferred embodiment, piping layer P overlaps the first, second and third layers, as shown in FIG. 2, and each of the first, second and third layers have an equal length and width.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A soft leak-proof protective blanket comprising:
   a first layer that allows a liquid to pass through and having a first length and a first width and having a first thickness,
   a second layer that is absorbent and having a second length and a second width substantially equal to the first length and first width and having a second thickness greater than the first thickness;
   the first layer being bound to the second layer in a fashion consisting of stitching wherein the stitching forms a quilted pattern of the first layer to the second layer;

a third layer that stops the liquid and having a third length and a third width substantially equal to the first length and first width and having a third thickness less than the second thickness, the third layer comprising three sub layers stacked on top of each other, the middle sub layer less absorbent than the other two sub layers, wherein the other two sub layers are cotton sheetings adhered on both sides of the middle sub layer to completely cover both sides of the middle sub layer, and the middle sub layer is rubber sheeting; and a border material sandwiching the entire perimeter of the three layers, and overlapping the top of the first layer and bottom of the third layer to create edges of the border material inside edges of the top and bottom of the first and third layer, respectively and affixing the quilted first layer and second layer with the third layer, wherein the border material traps liquid at the edges of the first, second and third layers.

2. The soft leak-proof protective blanket of claim 1 wherein the second layer is a cotton or polyester batting.

3. The soft leak-proof protective blanket of claim 1, wherein the middle sub layer of the third layer becomes adhesive on both sides when activated by pressure.

4. The soft leak-proof protective blanket of claim 1, wherein the middle sub layer becomes adhesive on both sides when activated by heat.

* * * * *